United States Patent
Egawa (10) Patent No.: US 7,227,620 B2
(45) Date of Patent: Jun. 5, 2007

(54) ENVIRONMENT RECOGNITION SYSTEM AND MOBILE MECHANISM

(75) Inventor: Saku Egawa, Toride (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 11/169,743

(22) Filed: Jun. 30, 2005

(65) Prior Publication Data

US 2006/0017912 A1    Jan. 26, 2006

(30) Foreign Application Priority Data

Jul. 22, 2004    (JP)    ............... 2004-213729

(51) Int. Cl.
*G01C 3/08* (2006.01)
(52) U.S. Cl. .............. 356/4.03; 356/4.01; 356/5.01
(58) Field of Classification Search .......... 356/4.03
See application file for complete search history.

(56) References Cited

U.S. PATENT DOCUMENTS 6,246,468 B1 * 6/2001 Dimsdale ............... 356/4.02

FOREIGN PATENT DOCUMENTS

| JP | 2002-55158 | 2/2002 |
| JP | 2002-368720 | 12/2002 |

\* cited by examiner

*Primary Examiner*—Thomas H. Tarcza
*Assistant Examiner*—Luke Ratcliffe
(74) *Attorney, Agent, or Firm*—Crowell & Moring LLP

(57) ABSTRACT

An environment recognition system recognizes a substance moving in relative thereto, with using a modulated beam. A beam emitting means emits a beam. A beam scanning means scans the beam. A beam receiving means detects the beam reflected from the substance. Upon basis of the signal received by the beam receiving means, a distance measuring means obtains a distance image. Comparing plural numbers of the images obtained by the distance measuring means, a distortion removal means removes distortion of the substance contained within the distance image.

5 Claims, 4 Drawing Sheets

ENVIRONMENT RECOGNITION SYSTEM AND MOBILE MECHANISM

BACKGROUND OF THE INVENTION

The present invention relates to an environment recognition system for automatically recognizing an environment or peripheral circumstances, as well as, a mobile mechanism with use thereof, and in particular, it relates to the environment recognition system for recognizing a substance within the peripheral circumstances or environment with using a laser beam therein, as well as, the mobile mechanism with use thereof.

In relation to the conventional art, an example of a range finder or distance measuring system is described, for instance, in Japanese Patent Laying-Open No. 2002-368720 (2002). In the distance measuring method described in this publication, towards a target to be measured the distance therebetween (hereinafter, a distance-measurement target) is emitted a carrier wave, which is code-modulated through a first PN code having a predetermined frequency, and then the carrier wave reflected from the target is received. And, a second PN code is produced, having the same PN code but differing from the first PN code, a little bit, in the frequency thereof. A first burst-like correlation signal is obtained from those first and second PN codes, while a second burst-like correlation signal from the carrier wave and the second PN signal, and the distance to the target is obtained from the phase difference between those and the phase difference between the signals, which are obtained through integration of those first and second burst-like signals.

Other example of such the distance measuring apparatus is described, for example, in Japanese Patent Laying-Open No. 2002-55158 (2002). In the distance measuring apparatus described in this publication, a transmittal signal generator portion generates the PN signal of a predetermined chip length, while a light-emitting portion emits a laser light corresponding to the PN code. A light-receiving portion receives the light reflected from the target thereupon, and after digitalization is found the correlation between the PN code; thereby measuring the distance. In that instance, a direct-current component and low-frequency signals are removed from the received signal, and at the same time the transmittal signal generator portion generates the PN signal from the time when the light-receiving portion starts receiving of the signals until to the time when it starts outputting of stable received signals.

With such the conventional distance measuring system as was mentioned above, the laser must be made scanned, mechanically; therefore, it takes a long time to detect the distance to the distance-measurement target, and also there is a possibility of looking over the distance-measurement target under the condition when the target is moving. Also, under the condition when the distance-measurement target is moving, and furthermore when the distance-measurement target lies within a substance, which is under the condition of movement, there is a possibility that distortion is caused on the configuration of the distance-measurement target detected. For this reason, when the distance-measurement target moves at high velocity, or on the contrary thereto, when the distance measuring system moves at high velocity, it is impossible to grasp or recognize the peripheral circumstances or environment, correctly. Further, the distance measuring apparatus described in those Japanese Patent Laying-Open No. 2002-368720 (2002) and Japanese Patent Laying-Open No. 2002-55158 (2002), for example, there is given the detailed description, in particular, in relation to processing of such the signals measured; however, there is no consideration paid upon a means for dissolving the drawbacks of the conventional arts mentioned above.

BRIEF SUMMARY OF THE INVENTION

According to the present invention, being achieved by taking the drawbacks of those conventional arts mentioned above into the consideration, an object thereof is to provide an environment recognition system, for recognizing the distance-measurement target, correctly, even under the condition when the distance-measurement target is moving, or on the contrary when the distance measuring system is moving, as well as, a mobile mechanism with use thereof. And, other object according to the present invention is to provide a distance measuring system and a distance measuring method, for enabling to capture or recognize even a moving substance moving at high velocity, with certainty.

For accomplishing the above-mentioned object, according to the present invention, firstly there is provided an environment recognition system for recognizing a substance moving in relative thereto, with using a modulated beam, comprising: a beam emitting portion for emitting the beam therefrom; a beam scanning portion for scanning the beam; a beam receiving portion for detecting a beam reflected from the substance; a distance measuring portion for obtaining a distance image upon basis of a signal received upon said beam receiving portion; and a distortion removal portion for making comparison between plural numbers of the distance images obtained by said distance measuring portion, so as to remove distortion of the substance, which is included within the distance images.

According to the present invention, the environment recognition system as described in the above, preferably further comprises a means for changing an interval between plural numbers of measurement points, which are included within the distance image. And, in the environment recognition system as described in the above, said means for chaining the measurement interval may establish the measurement points all over an area of the distance image at a large interval in an initial stage, and after detecting the substance moving in relative thereto within the distance image, which is measured with the large interval, it may determine the measurement points at an interval smaller than that before, in vicinity of an area including that substance therein, or said means for chaining the measurement interval may make the interval between the measurement points narrow in a central portion of the distance image, while the interval between the measurement points wide in a peripheral area thereof.

Also, according to the present invention, for accomplishing the object mentioned above, there is provided a moving mechanism, mounting an environment recognition system as was mentioned in the above, for recognizing a substance moving in relative thereto, with using a modulated beam, wherein the beam is a laser beam.

Further, according to the present invention, for accomplishing the object mentioned above, there is also provided an environment recognition system, comprising: a beam oscillator; a beam scanner for scanning the beam oscillated from said beam oscillator; a scanning controller portion for controlling said beam scanner; a beam receiver for receiving the beam thereon; a means for measuring a time-period elapsing from a time when said beam oscillator oscillates the beam until a time when said beam receiver receives the beam; and a distance measuring portion for measuring a distance up to the substance moving in relative thereto upon basis of the elapsing time-period measured, further comprising a moving substrate detecting portion provided for detecting a position on the substance from configuration information, which said distance measuring portion measures, and within said scanning controller portion is provided a portion for exchanging between a standard mode for scanning over a standard scanning region and a partial scanning mode for scanning over a partial scanning region within the standard scanning region, including the position of the substance, which is detected by said moving substrate detecting portion.

Also, according to the present invention, preferably, the environment recognition system as described in the above further comprises a moving-substance velocity detecting portion for detecting a velocity of the substance moving in relative thereto, and a configuration compensation portion for compensating the configuration information measured by said distance measuring portion, upon basis of a relative velocity of the substance, which said moving-substance velocity detecting portion detects, and preferably, further comprises a modulation signal generator provided for generating a pseudo-noise signal, so as to modulate the beam oscillated by said beam oscillator, wherein said distance measuring portion further comprises plural numbers of correlators for calculating correlations between delayed modulation signals, which are obtained through delaying the modulation signals generated by said modulation signal generators by predetermined delay times different from each other, respectively, and received signals received by said beam receiver, a selecting portion for selecting one correlator from said plural numbers of correlators, an output of which is greater than a preset threshold value set for each thereof and also has a minimum delay-time, and a distance calculating portion for calculating out the distance to the substance upon basis of the output of the one correlator, which said selecting portion selects out, and an output of other correlator having the delay-time nearest to the delay-time of said one correlator.

Furthermore, according to the present invention, for accomplishing the object mentioned above, there is also provided a mobile mechanism mounting an environment recognition system for obtaining configuration information about a substance in periphery thereof, so as to control a moving route upon basis of a distance image obtained by said environment recognition system, wherein said environment recognition system obtains the distance information a central portion area of being a moving direction of said mobile mechanism, at an interval finer than that in a peripheral portion area thereof, on the distance image obtained. And, according to the present invention, preferably, the mobile mechanism as described in the above further comprises a velocity-detecting portion for detecting a moving velocity of said mobile mechanism, wherein said environment recognition system further comprises a configuration information compensating portion for compensating the distance image upon basis of the moving velocity of said mobile mechanism, which said velocity-detecting portion detects.

BRIEF DESCRIPTION OF THE SEVERAL VIEWS OF THE DRAWING

Those and other objects, features and advantages of the present invention will become more readily apparent from the following detailed description, when taken in conjunction with the accompanying drawings, wherein.

DETAILED DESCRIPTION OF THE INVENTION

Figure 1:
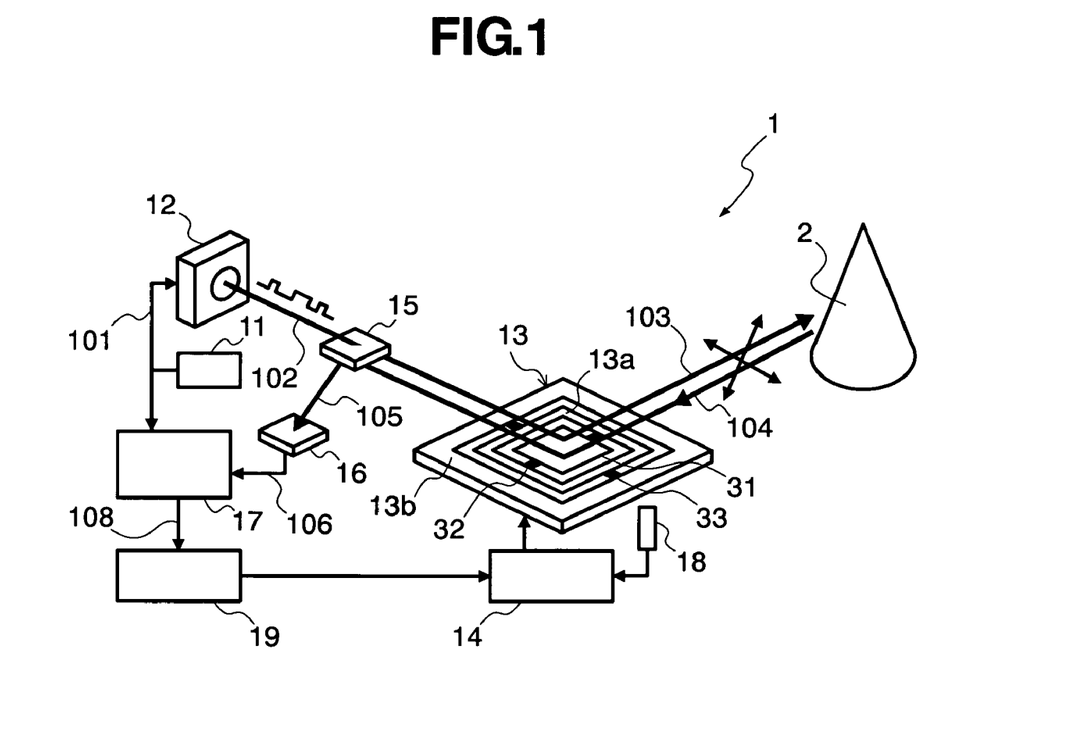
FIG. 1 is a block diagram of an environment recognition system, according to one embodiment of the present invention.

Hereinafter, explanation will be made about an environment recognition system, according to an embodiment of the present invention, by referring to the drawings attached herewith. FIG. 1 shows the block diagram of the environment recognition system, wherein the environment recognition system 1 comprises a modulation-signal generator 11 for generating a modulation signal 101. A laser oscillator 12 oscillates a laser beam, which is modulated with using the modulation signal 101 generated. The laser beam 102 modulated is then deflected in the direction thereof, upon a movable mirror 13, which is driven by a mirror-driving device 14, so as to be scanned. An angle of the movable mirror 13 is detected by means of a mirror-angle sensor 18.

The laser beam 103 emitted from the laser oscillator 12 is reflected upon a substance 2 within an outside, being the distance-measurement target, thereby turning into a reflected light 104. This reflected light 104 is divided from the emission light, etc., through a beam splitter 15. The laser beam 105 divided is received upon the laser receiver 16. A received signal 106 outputted from the laser receiver 16 is transmitted to a distance measuring circuit 17. Into this distance measuring circuit 17 is inputted also the modulation signal 101 generated from the modulation-signal generator 11. This distance measuring circuit 17 measures the distance up to the substance 2. A result of this measurement is transmitted into a measurement controller device 19. The measurement controller device 19 controls each of equipments building up the present system; such as, the mirror-driving device 14, etc., for example.

The details of the respective constituent elements are as will be mentioned below. The movable mirror 13 rectangular-shaped has a rectangular movable mirror 31, being disposed at a central portion thereof, a first frame 13a, being disposed putting a gap between that movable mirror 31, and a second frame 13b, being disposed putting a further gap between that first frame 13a. Torsion springs 32 are disposed, each being inserted between one of the two (2) opposite sides of the mirror 31 and one of the two (2) opposite sides of the first frame 13a, opposing to each other, respectively; thereby, supporting the movable mirror 31 to be rotatable with respect to the first frame 13a.

Springs 33 are disposed at two (2) positions, each inserted between one of the outer opposite sides of the first frame 13a, extending into a direction orthogonal to that side of the first; frame 13a, on which the movable mirror 31 is supported, and one of the opposite sides of the second frame 13b, opposing thereto, respectively; thereby, supporting the first frame 13a to be rotatable with respect to the second frame 13b. The movable mirror 13 has a driving mechanism, not shown in figures, for driving the movable mirror 31 through the electromagnetic force or the electrostatic force. And, the angle of the movable mirror 31 is changed, into two (2) directions, i.e., the vertical direction and the horizontal direction, freely.

The movable mirror 13 is manufactured with using the Micro Electro-Mechanical System (MEMS). One side of the movable mirror 31 is made to be equal or less than 10 mm. Miniaturization of the movable mirror 31 enables to reduce the inertial mass of the movable mirror 31, and also enables to change the mirror swing angle at high speed; thereby obtaining high-speed scanning of the laser beam 103.

The measurement controller device 19 gives an instruction of the mirror swing-angle to the mirror driver device 14, so as to control the scanning region or area of the laser beam 103. The mirror driver device 14 drives the movable mirror 31 responding to the instruction from the measurement controller device 19, while referring to the detected angle of the movable mirror 31, which the mirror angle sensor 18 detects. The laser beam 103 modulated with the modulation signal 101 is bent upon the movable mirror 31, to be irradiated upon an area or region where the substance 2 is included therein. And, the laser beam reflecting upon the substance 2 reaches to the laser receiver 16, to be converted into the received signal 106. The distance measuring circuit 17 obtains a distance 108 from the environment recognition system 1 to the substance 2, through the delay time; i.e., the time difference between the modulation signal 101 and the received signal 106. The measurement controller device 19 obtains configuration information of the substance 2 within the scanning area, from two-dimensional (2D) information in relation to the distance up to the substance 2, which is obtained by the distance measuring circuit 17.

Figure 2:
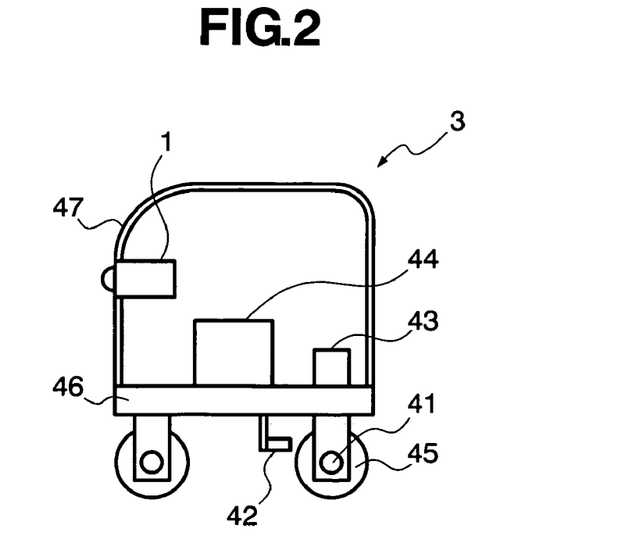
FIG. 2 is a side cross-section view of a mobile mechanism, which mounts the environment recognition system shown in FIG. 1 thereon, according to the one embodiment of the present invention.

FIG. 2 shows the view of a moving or mobile mechanism 3, which mounts the environment recognition system 1 shown in FIG. 1 thereon, in a form of the cross-section thereof. The mobile mechanism 3 has plural numbers of wheels 45, which are disposed in front and rear sides thereof, respectively, and are driven by a motor 41, and also a base portion 46, on the bottom surface of which are attached those wheels 45. On the base portion 46 are mounted a movement controller portion 44, for controlling rotation of the motor 41, and a gyro 43 for detecting the rotating speed of this mobile mechanism 3.

On the bottom surface of the base portion 46 are attached a speed sensor 42 for detecting a moving speed of the moving mechanism 3 through measuring the rotation number of the wheel 45. On an upper portion of the moving mechanism 3 and further in front of an advance direction thereof, there is attached the environment recognition system 1 for obtaining the configuration information of the substance 2 lying in a periphery of the mobile mechanism 3. On a side above the base portion 46 of the mobile mechanism 3 is overspread with a cover 57. The movement controller portion 44 guides the mobile mechanism 3 upon basis of the configuration information of the substances in peripheries, which the environment recognition system 1 obtains, so that the mobile mechanism 3 can move to a destination, but escaping from coming into contact with the substances in the peripheries.

Figure 3:
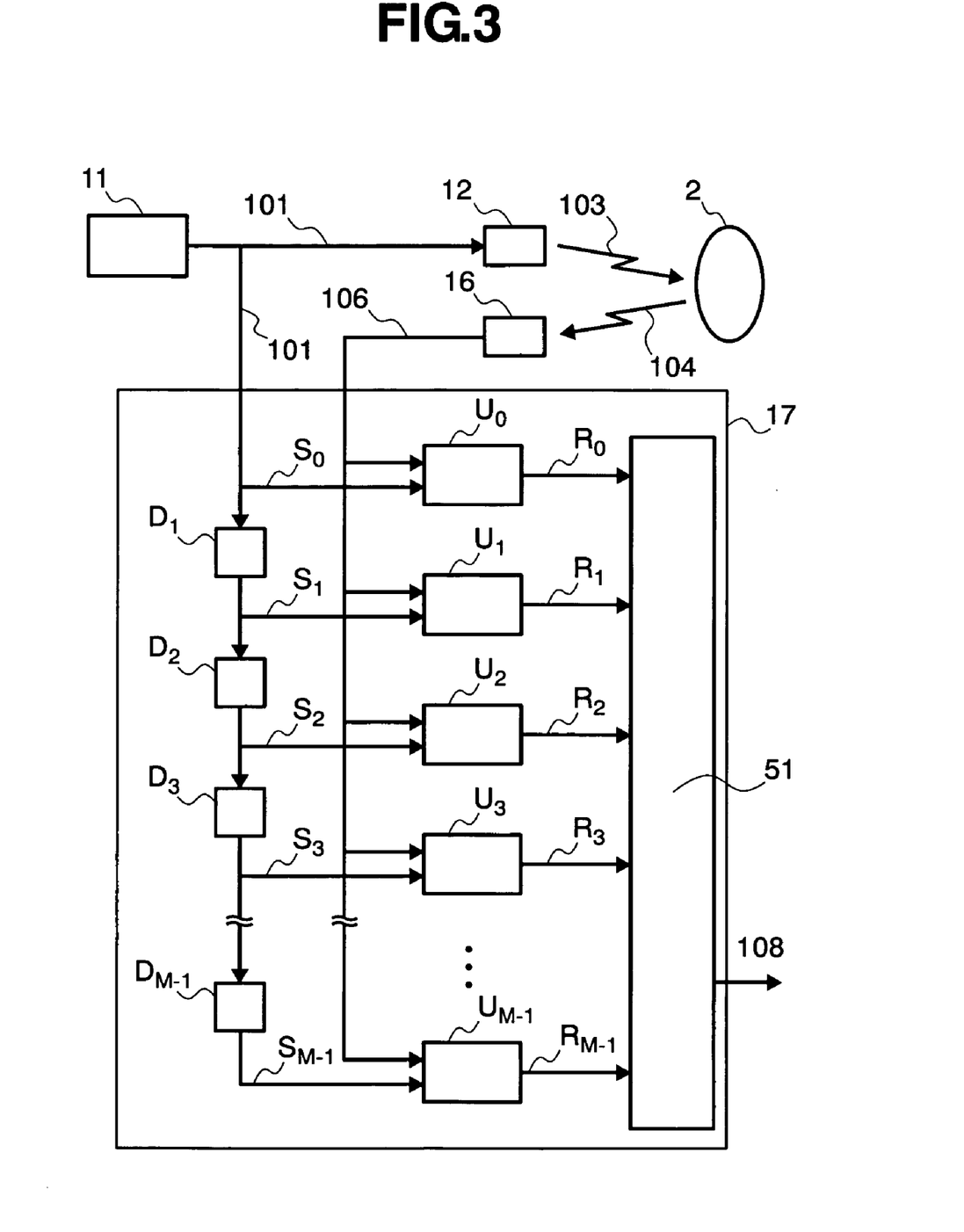
FIG. 3 is a block diagram of a distance measuring circuit installed into the environment acknowledging system shown in FIG. 1, according to the one embodiment of the present invention.

FIG. 3 shows the detailed structure of the distance measuring circuit 17, which is mounted onto the environment recognition system 1, in the form of a block diagram thereof. The modulation signal generator 11 generates a pseudo-random signal (PN code), which repeats a line of codes, i.e., aligning plural numbers (N pieces) of bits, each being "0" or "1", at random. The modulation signal 101 of the modulation signal generator 11 appears a signal of "0" or "1" per a time "T", and it repeats the same signal at a frequency of N×T. Upon receipt of the modulation signal 101 transmitted from the modulation signal generator 11, the lager oscillator 12 generates the laser beam 102 when the modulation signal 101 received is "1" in the value thereof. When the modulation signal is "0", the laser beam stops the oscillation. The laser beam 102 oscillated from the laser generator 12 comes to be the emission light 103 upon the movable mirror portion 13, and it reaches to the substance 2. Thereafter, it is reflected upon the substance 2, and then the reflected light 104 is detected as the received signal 106 on the laser receiver 16.

The received signals 106 on the laser received 16 are transmitted into the distance measuring circuit 17. This distance measuring circuit 17 comprises M sets of correlators $U_0$-$U_{M-1}$ and (M-1) sets of delays $D_1$-$D_{M-1}$. Herein, "M" is an integer being equal or less than the "N", i.e., the length of a PN code. The delays $D_1$-$D_{M-1}$ generate delay modulation signals $S_1$-$S_{M-1}$, which are delayed by a delay time T for each. Further, the modulation signal 101 is a delay modulation signal having a delay time of "0", i.e., the delay modulation signal $S_0$ having no delay. The correlators $U_0$-$U_{M-1}$ calculate out correlation values $R_0$-$R_{M-1}$ between the delay modulation signals $S_1$-$S_{M-1}$ and the received signals 106.

The $R_0$-$R_{M-1}$ can be obtained via integration thereof, after multiplying the delay modulation signals $S_1$-$S_{M-1}$ and the received signals 106. A distance calculator portion 51 detects a delay time "t" of the received signal 106 with respect to the modulation signal 101, with using the correlation values $R_0$-$R_{M-1}$, and obtains the distance 108 from the environment recognition system 1 up to the substance 2, upon basis of this delay time "t".

Details of a method for obtaining the distance from the distance measuring circuit 17 to the substance will be explained below. The received signal 106 is delayed by the time "t" from the modulation signal, depending upon the roundtrip distance between the environment,recognition system 1 and the substance 2. Assuming that velocity of light is "c", then the distance "L" from the environment recognition system 1 to the substance 2 can be expressed by the following equation, with using the delay time "t":

$$L = c \times t / 2 \qquad \text{(Eq. 1)}$$

Thus, if the delay time "t" can be measured, then it is possible to obtain the distance "L".

Since the PN signal is the random signal, therefore it has a strong self-correlation. For this reason, if obtaining the correlation between a signal of certain PN codes and a signal obtained through delaying that signal of PN codes by the time "t", the correlation is large in the value thereof when the time delay "t" is smaller, comparing to a time "T" of one (1) bit. On the other hand, the time delay "t" is equal or greater than the time "T" of one (1) bit, and then the correlation value comes to be almost zero (0). Accordingly, a relationship between the time delay "t" of the received signals 106 and the correlation values $R_0$-$R_{M-1}$, i.e., outputs of correlators $U_0$-$U_{M-1}$, as shown in FIG. 4; it can be presented by a waveform obtained from overlapping a reference conical waveform on each other, each shifted into the direction of a "t" axis.

Namely, assuming that "A" is a value to be determined by amplitude of the received signal 106, the following relationship can be obtained:

$$\left.\begin{array}{l}\text{When } (i-1)\times T \le t \le i\times T, \\ R_i = A \times (t/T - i + 1) \\ \text{When } i\times T < t \le (i+1)\times T, \\ R_i = A \times (i + 1 - t/T) \\ \text{When } T < (i-1)\times T, \text{ or } (i+1)\times T < t, \\ R_i = 0 \end{array}\right\} \quad \text{(Eq. 2)}$$

Figure 4:
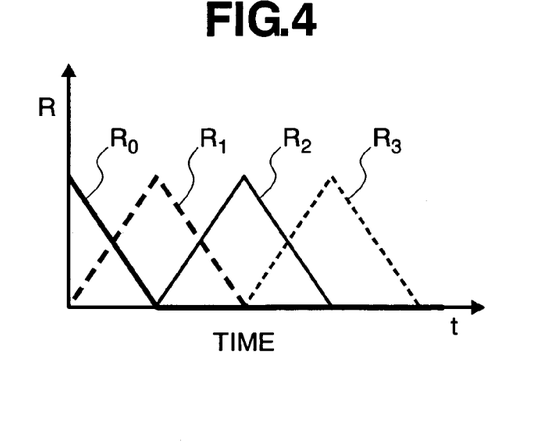
FIG. 4 is an explanatory view of showing a graph therein, for explaining about correlation signals.

In FIG. 4, it is assumed that the "A" is constant. Since the PN code is repeated for every N bits, therefore a peak value of the correlation appears, again, when the delay time comes close to T×N. Then, it is assumed that the delay time "t" be smaller than T×N.

Since the correlation values $R_0$-$R_{m-1}$, can be obtained, the distance calculator portion 51 calculates out the time delay "t". Assuming that "$W_i$" is the sum of the correlation values "$R_i$" and "$R_{i-1}$" neighboring with each other, then selection is made on one(s) having a value being larger than a predetermined threshold value $H_i$ and at the maximum, among of those sums of correlation values "$W_i$". Herein, it is assumed that an order of alignment "i" is "k" corresponding to that sum of correlation values "$W_i$", which is selected. With this, it is determined that the time delay "t" lies between k×T and (k+1)×T. The threshold value "$H_i$" is set up for the purpose of protecting the light for detecting the distance to the substance 2 from being disturbed with the lights reflected by dusts and mists floating within the air. Intensity of the reflected light 104 received is in reverse proportional to the second power of the distance; therefore, the threshold value "$H_i$" can be determined as follows, depending upon the alignment order "i" corresponding to the time delays.

$$H_i = H_0/(i+1)^2 \quad \text{(Eq. 3)}$$

Where, "$H_0$" is the threshold value for the sum "$W_0$" of the correlation value at the nearest distance, and it is determined from an experiment. Then, with using two (2), pieces of the correlation values, i.e., "$R_k$" and "$R_{k+1}$", the time delay "t" can be obtained from the following equation:

$$t = T \times (((R_{k+1} - R_k)/(R_k + R_{k+1}) + 1)/2 + k) \quad \text{(Eq. 4)}$$

Where, since the time delay "t" is obtained by using a ratio between the sum and the difference of correlation values "$R_k$", then ill influences due to the reflectivity upon a surface of the substance 2 can be omitted. The distance "L" can be obtained from the time delay "t", by using the following equation:

$$L = c \times t/2 \quad \text{(Eq. 5)}$$

According to the present embodiment, it is possible to detect the distance, correctly, without receiving the ill influences due to the reflectivity upon the surface of substance 2 and/or the dusts and/or mists floating within the air. However, the calculations in the present embodiment may be executed by means of hardware, including analog circuits and digital circuits therein, for example, or may be executed with using a microcomputer and software.

A region of the distance measurable depends upon the unit of time "T" and the number "M" of the correlators. The time delay "t" measurable is equal or less than (T×M); therefore, the maximum measurable distance "$L_{max}$" is, "$L_{max}$"=(c×T× M/2). The resolution of the distance measurement depends on the unit of time "T" in the modulation with using the PN code therein, and also the length "N" of modulation. Since the resolving power on the measurement time "t" is T/N, approximately; therefore, the resolving power "$L_{res}$" of distance measurement is "$L_{res}$"=c×T×N/2. The measurement time "$T_m$" is determined by a time for the correlation calculations. Because the minimum time for correlation calculations is equal to the period of the PN code, then the measurement time "$T_m$" is $T_m$=T×N.

For instance, when T=1 ns=$10^{-9}$ s, M=100, and N=100, since the light velocity is c=3×$10^8$ m; therefore, the maximum measurable distance "$L_{max}$" is $L_{max}$=0.5×3×$10^8$×1×$10^{-9}$×100=15 m. While, the resolving power "$L_{res}$" of distance measurement is $L_{res}$=0.5×3×$10^8$× 1×$10^{-9}$/100=1.5×$10^{-3}$ m=1.5 mm.

As can be seen from the equations established among the maximum measurable distance "$L_{max}$", the resolving power "$L_{res}$" of distance measurement, and the measurement time "Tm", the measurement can be made upon the distance at high speed and high resolution, if making the unit of time "T" of the PN-code modulation short while the length of the code long. Also, if increasing the number of the correlators "$U_j$", the range or region of distance measurable can be widen or extended.

Figure 5A:
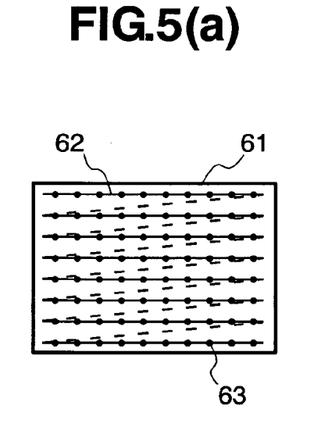
FIGS. 5(a) and 5(b) are explanatory views for explaining about a scanning mode.
Figure 5B:
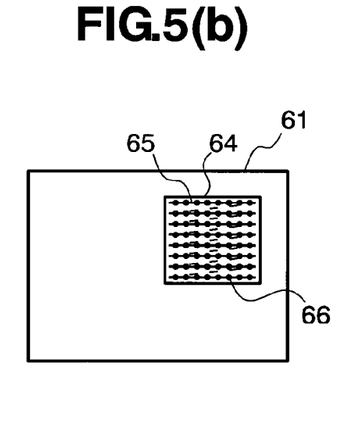

Next, explanation will be made about a scanning mode, for the environment recognition system 1 to scan the laser beam 102. FIGS. 5(a) and 5(b) show an example of a region 61 including the substance 2 therein and the distance-measurement points 63 and 66 within that region 61, under two (2) different scanning modes. Thus, the environment recognition system 1 comprises a standard scanning mode and a partial scanning mode. Under the standard scanning mode shown in FIG. 5(a), the swing angle of the movable mirror 13 is set to be large. The laser beam 103 is moved from the right-hand side to the left-hand side, along a scanning line 62 that is determined within the standard scanning region 61, or alternately, in the direction opposite thereto. In that instance, the scanning is made in zigzag around the center of the scanning line 62, i.e., a two-dimensional manner. During the scanning, the measurement is made upon the distance up to the substance 2 in periphery, at the measurement points 63, at a predetermined time period or interval, thereby obtaining a distance image.

Under the partial scanning mode shown in FIG. 5(b), the swing angle of the movable mirror 13 is set to be small, so that the scanning is made only within a partial scanning area or region 64, which is selected from the standard scanning region 61. In this instance, the distance between the scanning lines of the laser beam is made to be narrow, comparing to that under the standard scanning mode. At the same time, the moving velocity of the laser beam 103 is made slow, and the distance is narrowed between the measurement points.

Those two (2) modes are used, while being exchanged in the following steps.

First, the standard scanning mode is selected, and then the distance image is obtained from an inside of the wide region (i.e., the standard region), including the substance 2 therein, i.e., the configuration information of the substance 2, roughly (step 100). This operation of obtaining the distance image is repeated. Comparison is made between the distance images, which are obtained at the times differing from each other, and from a change thereof is detected a position of the substance 2 that is under the movement (step 110). The partial scanning region is set up around the moving substance 2 detected. And then, the mode is changed into the partial scanning mode, wherein the configuration information is obtained of the moving substance at high resolving power(step 120). Upon basis of the configuration information of the moving substance 2 obtained, recognition is made on a sort or kind of the moving substance 2.

According to the present method, since the scanning region is narrowed from the standard region into the partial scanning region, then the time necessary for the scanning is hardly changed, even when scanning at the high resolution; therefore, it is possible to recognize even if the substance moving at high speed and also at high resolution.

Figure 6A:
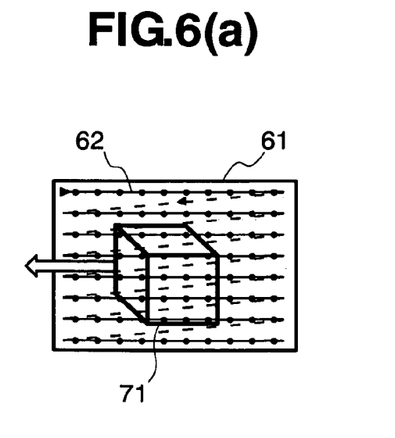
FIGS. 6(a) and 6(b) are explanatory views for explaining about distortion information of configuration information.
Figure 6B:
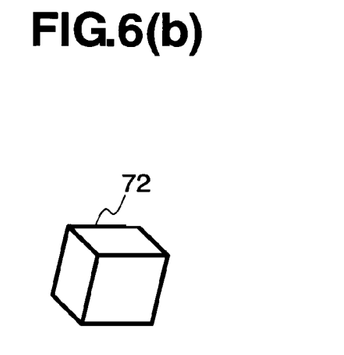

In the recognition of the moving substance 2 mentioned above, however, due to the time difference between the time when starting the laser scanning and the time when completing it, there is a possibility of recognizing the substance 2 to be a configuration distorted. Thus, since the substance is still moving when conducting the laser scanning thereupon, there may be included dynamic components of the substance 2 within the recognition the configuration thereof. Then, such distortion should be compensated, so that a true configuration of the substance can be recognized. This situation will be explained, by referring to FIGS. 6(*a*)and 6(*b*). This FIG. 6(*a*)shows a relationship between the moving substance 2 and the distance-measurement point at a certain instance, and FIG. 6(*b*)shows the configuration information of the moving substance 2, which can be obtained as a result of the distance measurement.

Since the laser beam 103 is scanned in zigzag manner along the scanning line 62 within the scanning region 61, then the substance 2 changes the position thereof between those time-points; i.e., between the initial time-point of the scanning and the time-point after that scanning. For this reason, if obtaining the configuration information about the moving substance 71, which is moving at high velocity, a distortion may be produced in the configuration information 72 obtained about the moving substance 71. While referring to FIG. 7 for explaining about compensation of the distortion, the steps for compensating that distortion will be mentioned hereinafter.

Figure 7:
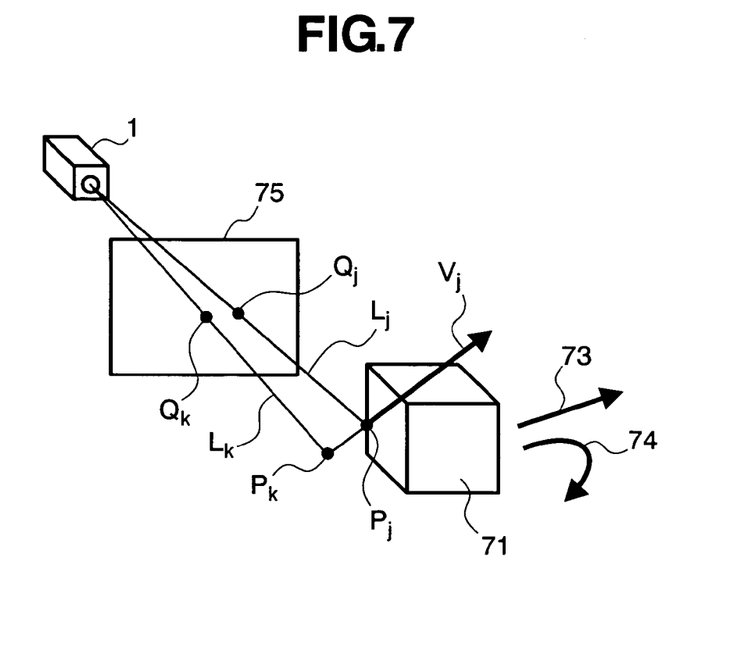
FIG. 7 is an explanatory view for explaining about distortion compensation.

Scanning of the laser beam 103 is made within the region including the moving substance 71 therein. While repeating this operation by plural numbers of times, the distance pictures 75 are obtained in plural numbers thereof. Comparison is made between plural numbers of the distance images 75 obtained, and calculations are made about a moving velocity 73 and a rotation speed 74 of the moving substance 71 (step 200). The laser scanning is made on the region including the moving substance 71. And, measurement is made on the distance "$L_j$" from the environment recognition system 1 to the moving substance 71 at a point "$P_j$" upon the surface thereof, thereby, obtaining three-dimensional (3-D) coordinates of the point "$P_j$" At the same time, the measurement is made upon the time-period elapsing from the time when the scanning starts (step 210).

From the moving velocity 73 and the rotation speed 74 of the moving substance 71 can be obtained a moving velocity vector "$V_j$". By using this moving velocity vector "$V_j$" and the time-period elapsing from the start of scanning, the position "$P_j$" can be assumed at the time-point when the scanning starts. The point assumed is set to be a point "$P_k$" (step 220). Into an attribute data of a point "$Q_k$" on the distance image 75 corresponding to that point "$P_k$" assumed, the assumed distance "$L_k$" from the environment recognition system 1 to the point "$P_k$" is written (step 230). With such operation, the distortion can be removed from the distance image 75.

In the embodiment mentioned above, there is supposed a case where the environment recognition system 1 is located at a fixed position, however, it is also possible to mount the environment recognition system 1 on a mobile mechanism 3 (see FIG. 2). When the environment recognition system 1 is mounted on the mobile mechanism 3, the distortion is caused all over the entire configuration information, which the environment recognition system 1 obtains, due to the movement of the mobile mechanism 3. If the configuration information is distorted, there is a possibility that the mobile mechanism may contact on the substance 2. Then, on the mobile mechanism 3 is provided a means for compensating the distortion. This situation will be explained, by referring to FIG. 7. In the present embodiment, what is indicated by a reference numeral 71 is a surrounding substance, which does not move, but what is indicated by a reference numeral 1, i.e., the environment recognition system that can moves.

With using outputs of the speed sensor 42 and the gyro 43 mounted on the mobile mechanism 3, the movement controller portion 44 calculates out; a moving velocity 45 and a rotation speed 46 (step 300). The laser light 103 makes scanning upon an area or region, where the surrounding substance 71 is included therein. Then, measurement is made upon the distance "$L_j$" from the mobile mechanism 3 to the point "$P_j$" on the surface of the surrounding substance 71. The relative three-dimensional coordinates are obtained, about the point "$P_j$" upon basis of the mobile mechanism 3. At the same time, measurement is made upon the time-period elapsing from the time when the scanning starts (step 310).

With using the moving velocity 45 and the rotation speed 46 of the mobile mechanism 3, the moving velocity vector "$V_j$" is obtained, of the point "$P_j$" relative to the mobile mechanism 3. Upon basis of the moving velocity vector "$V_j$" and the time-period elapsing from the time when the scanning starts, the position is assumed of the point "$P_j$" at the time when the scanning starts. This point assumed is made to be the point "$P_k$" (step 320). Into the attribute data of the point "$Q_k$" on the distance image 75 corresponding to the point "$P_k$" assumed, the assumed distance "$L_k$" from the mobile mechanism 3 to the point "$P_k$" is written (step 330). Since the distortion can be removed from the distance image 75, then the movement controller portion 44 can move the mobile mechanism 3, without contacting on the surrounding substance 71.

When the mobile mechanism 3 is under the movement, a programmed route of movement may appears at a central portion in the front thereof, in the direction of movement, in many cases thereof. Then, within the environment recognition system 1 is provided a central portion emphasis-scanning mode, for letting the laser light 103 to make scanning, in particular, about the front center lying on a line extending along the programmed route of movement, preponderantly. This situation will be explained by referring to FIG. 8.

Figure 8:
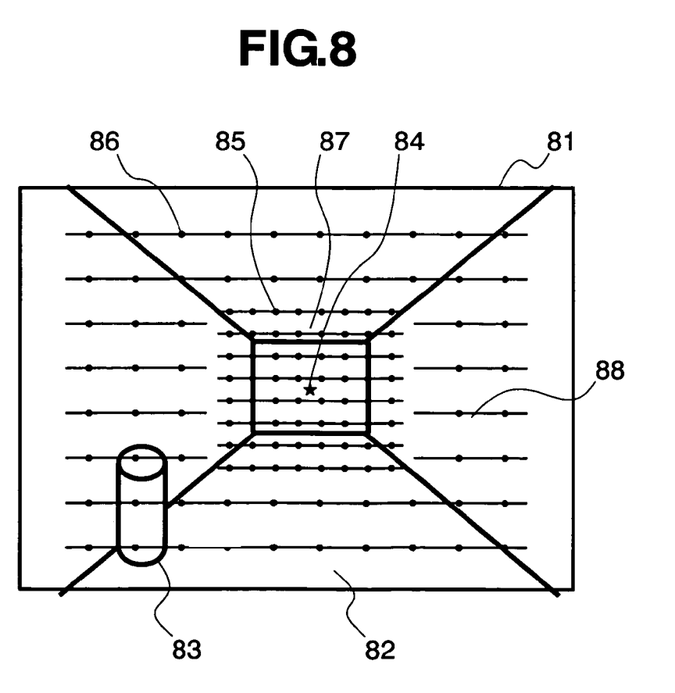
FIG. 8 is an explanatory view for explaining about a central-portion emphasizing scan mode.

The environment recognition system 1 obtains the distance image 81. This distance image 81 has distance information in the form of the attribute data. Measurements are made about the distances up to a corridor 82 and an obstacle 83, and the distances are written, into the attribute data. With an effect of the scenography or perspective, the substance in vicinity of the mobile mechanism 3 appears to be large, while that in a distance to be small. The substance near to a present position of the mobile mechanism 3 appears covering all over the distance image 81, however the substances near to a coming route of movement from now are centered around in the vicinity of a point 84 on the distance image 81, corresponding to the direction of advance of the mobile mechanism 3.

The movement controller portion 44 transmits the information about the direction of advance of the mobile mechanism 3 to the measurement controller device 19. The measurement controller device 19 controls the mirror driver device 14 upon basis of the transmitted information about the direction of advance. In that instance, upon the area or region 87 around the direction 84 of advance, as is shown in FIG. 8, scanning of the laser light 103 is made at a narrow interval and low speed, thereby measuring the distances at measurement-points 85 determined to be narrow in the interval thereof. In an area or region 88 other than that, the scanning of laser light 103 is made at a wide interval and high speed, thereby measuring the distance at measurement-points 86 determined to be rough in the interval thereof.

According to the present method, comparing to a case when the measurement is made, which is determined to be narrow all over the entire area or region of the distance image 81, it is possible to reduce a number of the measurement-points within such a range that no difficulty will caused in movement of the mobile mechanism 3; therefore, an efficiency can be improved on the measurement. Also, the obstacle can be detected in vicinity of the position where the mobile mechanism 3 locates at present, only by scanning the laser light 103, roughly, all over the entire area or region of the distance image 81. The obstacle(s) in distance along the route of movement can be detected, by scanning the laser light 103, finely at a central portion on the distance image 81. Accordingly, it is possible to detect the obstacle(s), on which the mobile mechanism 3 may possibly contact, without omission and at high efficiency.

The environment recognition system 1 may be utilized for the purpose of prevention of crimes, if it is provided in an inside of a building or structure. In more details, the environment recognition system 1 may be attached or provided on a corner of a room. If a person appears within the room, moving around, then the environment recognition system 1 recognizes he/she as the moving substance upon basis of the method mentioned above. With this, it is possible to find out an intruder into the room, but without omission. Since compensation is made on the distortion accompanying the detection of the moving substance, then the three-dimensional configuration can be detected without distortion, such as, of a face of the intruder, and therefore it is possible to identify a person with high precision.

If the mobile mechanism 3 is applied into a service robot, it can be used for the purpose of prevention of crimes within a home, etc. Or the mobile mechanism 3 may be the service robot to be used for security or physical distribution within an office or a public space. Thus, the robot rambles around within the home or the office, so as to recognize the substance(s) and/or the person(s). In that instance, since the distortion compensation is treated on the substance(s) and/or the person(s), which can be obtained from the distance image, then the substance(s) and/or the person(s) can be identified, at high accuracy. Also, since having a function of detecting an obstacle, there is no possibility that the robot may contact on the person moving therein, etc.

If being installed into an automobile, the environment recognition system 1 can be used for preventing a crash accident. The environment recognition system 1 is installed in a rear potion of an automobile and/or a front portion thereof, and then the measurement can be made always, upon the distance between a car running in front and the distance between a car running in rear. And, if a result of this measurement is linked with a brake, etc., it is possible to avoid a contact-accident due to sudden braking of the car running in front thereof, etc. Also, if installing the environment recognition system on a side surface or in front, it is possible to deal with a person running out from a side, too. In this case, it is not always necessary to compensate the distortion.

Further, if controlling the scanning area or region of the laser beam and also the interval between the measurement-points, it is possible to detect the obstacle(s) without omission, and it is also possible to detect the obstacle with certainty, such as, a car moving at high speed, for example. Measurement of distance on a car may easily receive the ill influences of mists and dusts outside. In such the case, applying the method for detecting distances with using the pseudo-noise signal detection enables the detection of an obstacle robustly.

However, in the various embodiments mentioned above, there is used the movable mirror, which is manufactured by applying the MEMS technology, for scanning the laser beam. Not limited only to such the movable mirror, but other movable mirrors, such as, a galvano-mirror and/or a polygon mirror, for example, also can be applied, by itself or in combination therewith. For scanning the laser beam at high speed, it is also possible to move a mirror through generation of the vibration resonance, by means of the mirror and a torsion spring, for example.

In the embodiment mentioned above, though one (1) set of the laser oscillator and one (1) set of the laser receiver are used; however, the laser oscillator and the laser receiver may be provided in plural numbers thereof, so that the scanning of the space can be conducted by plural numbers of the laser beams, simultaneously. In such the case, the configuration can be obtained at high speed, even of the substance covering over a wide range. Though the laser beam is applied for the measurement of distances in the embodiments mentioned above, however, it is also possible to apply, such as, radio waves or ultrasonic waves of other wavelength regions, for example, a LED light or a millimeter wave, etc.

According to the present invention, the beam is modulated to be reflected, and the distance image is made up from the beam reflected, wherein the distortion contained within that distance image is compensated, by means of the distortion compensation means; therefore, it is possible to recognize the distance-measurement target, correctly, even when the distance-measurement target is under the movement or when the distance measurement system is under the movement.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An environment recognition system for recognizing a substance moving relative thereto, with using a modulated beam, comprising:
   a beam emitting portion for emitting the beam therefrom;
   a beam scanning portion for scanning the beam;
   a beam receiving portion for detecting a beam reflected from the substance;

a distance measuring portion for obtaining a distance image upon basis of a signal received upon said beam receiving portion;

a distortion removal portion for making comparison between plural numbers of the distance images obtained by said distance measuring portion, so as to remove distortion of the substance, which is included within the distance images; and a means for changing an interval between plural numbers of measurement joints, which are included within the distance image, wherein said means for changing the measurement interval establishes the measurement points all over an area of the distance image at a large interval in an initial stage, and after detecting the substance moving relative thereto within the distance image, which is measured with the large interval, determines the measurement points at an interval smaller than that before, in vicinity of an area including that substance therein.

2. The environment recognition system, as described in claim 1, wherein said means for changing the measurement interval makes the interval between the measurement points narrow in a central portion of the distance image, while the interval between the measurement points wide in a peripheral area thereof.

3. A moving mechanism, mounting an environment recognition system thereon, for recognizing a substance moving relative thereto, with using a modulated beam, and being movable relative to the moving substance, wherein said environment recognition system comprises:

a beam emitting portion for emitting the beam therefrom;

a beam scanning portion for scanning the beam;

a beam receiving portion for detecting a beam reflected from the substance;

a distance measuring portion for obtaining a distance image upon basis of a signal received upon said beam receiving portion; and a distortion removal portion for making comparison between plural numbers of the distance images obtained by said distance measuring portion, so as to remove distortion of the substance, which is included within the distance images, wherein said environment recognition system further comprises a means for changing an interval between plural numbers of measurement points, which are included within the distance image, and wherein said means for changing the measurement interval establishes the measurement points all over an area of the distance image at a large interval in an initial stage, and after detecting the substance moving relative thereto within the distance image, which is measured with the large interval, determines the measurement points at an interval smaller than that before, in vicinity of an area including that substance therein.

4. The environment recognition system, as described in claim 3, wherein said means for changing the measurement interval makes the interval between the measurement points narrow in a central portion of the distance image, while the interval between the measurement points wide in a peripheral area thereof.

5. An environment recognition system, comprising:

a beam oscillator;

a beam scanner for scanning the beam oscillated from said beam oscillator;

a scanning controller portion for controlling said beam scanner;

a beam receiver for receiving the beam thereon;

a means for measuring a time-period elapsing from a time when said beam oscillator oscillates the beam until a time when said beam receiver receives the beam;

a distance measuring portion for measuring a distance up to the substance moving relative thereto upon basis of the elapsing time-period measured, further comprising a moving substrate detecting portion provided for detecting a position on the substance from configuration information, which said distance measuring portion measures, and within said scanning controller portion is provided a portion for exchanging between a standard mode for scanning over a standard scanning region and a partial scanning mode for scanning over a partial scanning region within the standard scanning region, including the position of the substance, which is detected by said moving substrate detecting portion; and a modulation signal generator provided for generating a pseudo-noise signal, so as to modulate the beam oscillated by said beam oscillator, wherein said distance measuring portion further comprises plural numbers of correlators for calculating correlations between delayed modulation signals, which are obtained through delaying the modulation signals generated by said modulation signal generators by predetermined delay times different from each other, respectively, and received signals received by said beam receiver, a selecting portion for selecting one correlator from said plural numbers of correlators, an output of which is greater than a preset threshold value set for each thereof and also has a minimum delay-time, and a distance calculating portion for calculating out the distance to the substance upon basis of the output of the one correlator, which said selecting portion selects out, and an output of other correlator having the delay-time nearest to the delay-time of said one correlator.

* * * * *